(12) United States Patent
Poulsen

(10) Patent No.: US 9,820,029 B2
(45) Date of Patent: Nov. 14, 2017

(54) DEVICE-ADAPTABLE AUDIO HEADSET

(71) Applicant: BLACKBERRY LIMITED, Waterloo (CA)

(72) Inventor: Jens Kristian Poulsen, Waterloo (CA)

(73) Assignee: BLACKBERRY LIMITED, Waterloo (CA)

( * ) Notice: Subject to any disclaimer, the term of this patent is extended or adjusted under 35 U.S.C. 154(b) by 179 days.

(21) Appl. No.: 14/689,153

(22) Filed: Apr. 17, 2015

(65) Prior Publication Data
US 2016/0309251 A1 Oct. 20, 2016

(51) Int. Cl.
*H04R 1/10* (2006.01)
*H04R 5/04* (2006.01)
(Continued)

(52) U.S. Cl.
CPC ............. *H04R 1/1041* (2013.01); *H04R 1/08* (2013.01); *H04R 5/04* (2013.01); *H04M 1/05* (2013.01); *H04M 1/6058* (2013.01); *H04M 1/72527* (2013.01); *H04M 1/72558* (2013.01); *H04R 3/00* (2013.01); *H04R 2201/107* (2013.01); *H04R 2420/09* (2013.01); *H04R 2430/01* (2013.01)

(58) Field of Classification Search
CPC .............................. H04M 1/05; H04R 1/1041
USPC ................ 381/74.1, 104, 74, 58; 340/13.27; 455/573, 572, 557, 559, 575.2
See application file for complete search history.

(56) References Cited

U.S. PATENT DOCUMENTS 6,016,352 A * 1/2000 Barmore ................ H03G 3/348
381/104
8,812,064 B2 * 8/2014 Lowles ............... H04M 1/6058
381/309
(Continued)

FOREIGN PATENT DOCUMENTS

EP 2190213 A1 5/2010
EP 2501114 A1 9/2012
(Continued)

OTHER PUBLICATIONS http://www.klipsch.com/S3m-headphones—Published Mar. 5, 2015.
European Search Report dated Aug. 22, 2016 for EP Application No. 1615004.9.

*Primary Examiner* — Vivian Chin
*Assistant Examiner* — Ubachukwu Odunukwe
(74) *Attorney, Agent, or Firm* — Perry + Currier Inc.

(57) ABSTRACT

A device-adaptable headset device is provided, comprising: a microphone; one or more speakers; an audio connector comprising: a microphone output pin; and one or more speaker input pins respectively connected to the one or more speakers; a microphone line between the microphone output pin and the microphone; a ground line; one or more input devices in communication with the microphone line; a first circuit and a second circuit respectively configured for active signalling and passive signalling on the microphone line; and, a processor configured to: determine a present signalling mode; when the signalling mode is active, and when the one or more input devices is actuated, generate active signals on the microphone line using the first circuit; and, when the signalling mode is passive, and when the one or more input devices is actuated, generate passive signals on the microphone line using the second circuit.

13 Claims, 9 Drawing Sheets

(51) Int. Cl.
*H04R 1/08* (2006.01)
*H04M 1/60* (2006.01)
*H04M 1/725* (2006.01)
*H04M 1/05* (2006.01)
*H04R 3/00* (2006.01)

(56) References Cited

U.S. PATENT DOCUMENTS

| | | | |
|---|---|---|---|
| 9,237,401 B2 * | 1/2016 | Modi | H04R 3/00 |
| 2009/0179768 A1 * | 7/2009 | Sander | H04M 1/05 |
| | | | 340/13.27 |
| 2013/0236025 A1 | 9/2013 | Ma et al. | |

FOREIGN PATENT DOCUMENTS

| | | |
|---|---|---|
| WO | 2004040941 A1 | 5/2004 |
| WO | 2012003720 A1 | 1/2012 |

* cited by examiner

DEVICE-ADAPTABLE AUDIO HEADSET

FIELD

The specification relates generally to audio headsets, and specifically to a device-adaptable audio headset.

BACKGROUND

Audio headsets are generally manufactured to communicate with a given type of device. For example, some devices rely on active signalling between an audio headset and the device to control audio functions, while other devices rely on passive signalling between an audio headset and the device to control audio functions. While software exists that can adapt the device to a signalling scheme used by the headset, such software must be loaded onto the device, and can use up processing resources at the device, as well as lead to delays in control of the audio functions as, for example, passive signalling is converted to audio control commands understood by the device.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
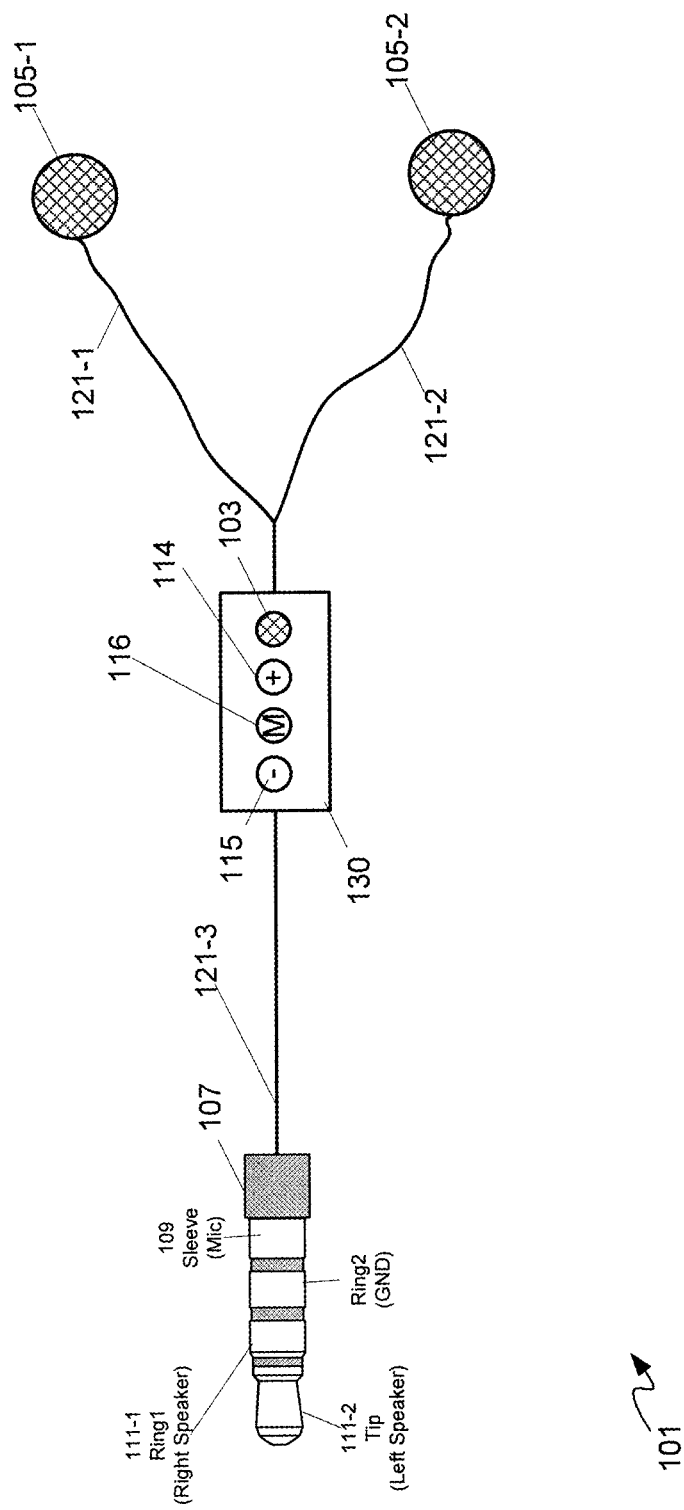
FIG. 1 depicts a perspective view of a device-adaptable audio headset, according to non-limiting implementations.

In general, this disclosure is directed to an audio headset that is adaptable to a signalling mode of a device to which the audio headset can be connected. The audio headset includes an active signalling circuit and a passive signalling circuit, each of which can be activated or deactivated depending on the signalling mode of the device to which the audio headset is connected. Such activation or deactivation can occur automatically, depending, for example, on a microphone bias voltage, and/or the microphone bias voltage being above or below a threshold microphone bias voltage. Alternatively, such activation or deactivation can be based on input received at an input device. The active signalling circuit can comprise a tone generator (e.g. transmitting a single pulse and/or sequences of pulses), and the passive signalling circuit can comprise one or more devices with predetermined respective impedances, including, but not limited to, resistors which can be used to change a load impedance on a microphone line by changing which of the one or more devices with predetermined respective impedance connect the microphone line to a ground line, based on input and/or switching of input devices.

In this specification, reference may be made herein to the terms program material, sound data and audio data which can refer to data used to drive a speaker and/or a loudspeaker including, but not limited to, voice data, music data, video data, and the like. In other words program material, sound data and audio data as used interchangeably herein can refer to sound data and/or sound files which can be processed to produce an input signal to a loudspeaker and/or a speaker. In some instances, the terms program material, sound data and audio data, however, will be used colloquially and interchangeably with the terms input signal and output signal, signifying that the program material, sound data and/or audio data is used to produce an input signal to a loudspeaker and/or an output signal that drives the loudspeaker, the output signal comprising a filtered version of the input signal.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . . " and "one or more . . . " language.

Furthermore, reference is made herein to a "present signalling mode"; the term "present" can be interchangeably used with the term "current". Indeed, the terms "present" and "current" generally refer to something that is happening "now". For example, the terms "present signalling mode" and/or "current signalling mode" refers to a signalling mode that is presently being used, for example by an external device to which headsets described herein can be connected and/or in communication with.

An aspect of the specification provides an audio headset comprising: a microphone; one or more speakers, each configured for use with a human ear; an audio connector comprising: a microphone output pin; and one or more speaker input pins respectively connected to the one or more speakers; a microphone line between the microphone output pin and the microphone; a ground line; one or more input devices in communication with the microphone line; a first circuit configured for active signalling on the microphone line; a second circuit configured for passive signalling on the microphone line; and, a processor in communication with the one or more input devices, the processor configured to: determine a present signalling mode; when the present signalling mode comprises an active signalling mode, and when the one or more input devices is actuated, generate active signals on the microphone line using the first circuit; and, when the present signalling mode comprises a passive signalling mode, and when the one or more input devices is actuated, generate passive signals on the microphone line using the second circuit.

The processor can be further configured to determine the present signalling mode by determining whether a microphone bias voltage is above or below a threshold microphone bias voltage.

The processor can be further configured to determine the present signalling mode based on a microphone bias voltage.

The processor can be further configured to determine the present signalling mode by receiving input from the one or more input devices, the input indicative of the present signalling mode.

The processor can be further configured to determine the present signalling mode based on data received on the microphone line.

The first circuit can comprise a tone generator, and the active signals comprise tones on the microphone line.

The second circuit can comprise one or more devices having predetermined respective impedance, and connections between the microphone line, the one more devices and the ground line, and the passive signals can comprise impedance changes on the microphone line that occur on the microphone line using the one or more devices having the predetermined respective impedance, the one or more input devices configured to, when actuated, change the connections to change impedance on the microphone line.

The second circuit can comprise one or more devices having a predetermined respective impedance connecting the microphone line to the ground line via one or more depletion mode devices, and the passive signals can comprise impedance changes on the microphone line that occur on the microphone line as the processor activates and deactivates the one or more depletion mode devices in response to actuation of the one or more input devices.

The audio headset can further comprise respective depletion mode devices, between the one or more input devices and the ground line, and the processor can be further configured to: deactivate the second circuit by controlling the respective depletion mode devices to one or more of an open state and a non-conducting state; and activate the second circuit by controlling the respective depletion mode devices to one or more of a closed state and a conducting state.

The one or more input devices can comprise a mute switch, and the second circuit can comprise a depletion mode device that conducts with no input signal, the depletion mode device connecting the mute switch to the ground line when the second circuit is active, the mute switch configured to connect the microphone line to the ground line when the mute switch is closed.

The ground line can be shared by each of the microphone and the one or more speakers.

The connector can comprise a 3.5 mm audio connector.

The audio headset can further comprise a memory storing input states of the one or more input devices mapped to given active signal outputs, and the processor can be further configured to, when the present signalling mode can comprise the active signalling mode, and when the one or more input devices is actuated, generate the active signals on the microphone line using the first circuit according to the given active signal outputs as based on received input states of the one or more input devices.

Another aspect of the specification provides a method comprising: at an audio headset comprising: a microphone; one or more speakers, each configured for use with a human ear; an audio connector comprising: a microphone output pin; and one or more speaker input pins respectively connected to the one or more speakers; a microphone line between the microphone output pin and the microphone; a ground line; one or more input devices in communication with the microphone line; a first circuit configured for active signalling on the microphone line; a second circuit configured for passive signalling on the microphone line; and, a processor in communication with the one or more input devices: determining, at the processor, a present signalling mode; when the present signalling mode comprises an active signalling mode, and when the one or more input devices is actuated, generating active signals on the microphone line using the first circuit; and, when the present signalling mode comprises a passive signalling mode, and when the one or more input devices is actuated, generating passive signals on the microphone line using the second circuit.

The method can further comprise determining the present signalling mode by determining whether a microphone bias voltage is above or below a threshold microphone bias voltage.

The method can further comprise determining the present signalling mode based on a microphone bias voltage.

The method can further comprise determining the present signalling mode by receiving input from the one or more input devices, the input indicative of the present signalling mode.

The method can further comprise determining the present signalling mode based on data received on the microphone line.

The first circuit can comprises a tone generator, and the active signals can comprise tones on the microphone line.

The second circuit can comprises one or more devices having predetermined respective impedance, and connections between the microphone line, the one more devices and the ground line, and the passive signals can comprise impedance changes on the microphone line that occur on the microphone line using the one or more devices having the predetermined respective impedance, the one or more input devices configured to, when actuated, change the connections to change impedance on the microphone line.

The second circuit can comprises one or more devices having a predetermined respective impedance connecting the microphone line to the ground line via one or more depletion mode devices, and the passive signals can comprise impedance changes on the microphone line that occur on the microphone line as the processor activates and deactivates the one or more depletion mode devices in response to actuation of the one or more input devices.

The audio headset can further comprise respective depletion mode devices, between the one or more input devices and the ground line, and the method can further comprise: deactivating the second circuit by controlling the respective depletion mode devices to one or more of an open state and a non-conducting state; and activating the second circuit by controlling the respective depletion mode devices to one or more of a closed state and a conducting state.

The one or more input devices can comprise a mute switch, and the second circuit can comprise a depletion mode device that conducts with no input signal, the depletion mode device connecting the mute switch to the ground line when the second circuit is active, the mute switch configured to connect the microphone line to the ground line when the mute switch is closed.

The ground line can be shared by each of the microphone and the one or more speakers.

The connector can comprise a 3.5 mm audio connector.

The audio headset can further comprise a memory storing input states of the one or more input devices mapped to given active signal outputs, and the processor can be further configured to, when the present signalling mode can comprise the active signalling mode, and when the one or more input devices is actuated, generate the active signals on the microphone line using the first circuit according to the given active signal outputs as based on received input states of the one or more input devices.

Yet a further aspect of the specification provides a computer-readable medium storing a computer program, wherein execution of the computer program is for: at an audio headset comprising: a microphone; one or more speakers, each configured for use with a human ear; an audio connector comprising: a microphone output pin; and one or more speaker input pins respectively connected to the one or more speakers; a microphone line between the microphone output pin and the microphone; a ground line; one or more input devices in communication with the microphone line; a first circuit configured for active signalling on the microphone line; a second circuit configured for passive signalling on the microphone line; and, a processor in communication with the one or more input devices: determining, at the processor, a present signalling mode; when the present signalling mode comprises an active signalling mode, and when the one or more input devices is actuated, generating active signals on the microphone line using the first circuit; and, when the present signalling mode comprises a passive signalling mode, and when the one or more input devices is actuated, generating passive signals on the microphone line using the second circuit. A computer-readable medium can comprise a non-transitory computer-readable medium.

Figure 2:
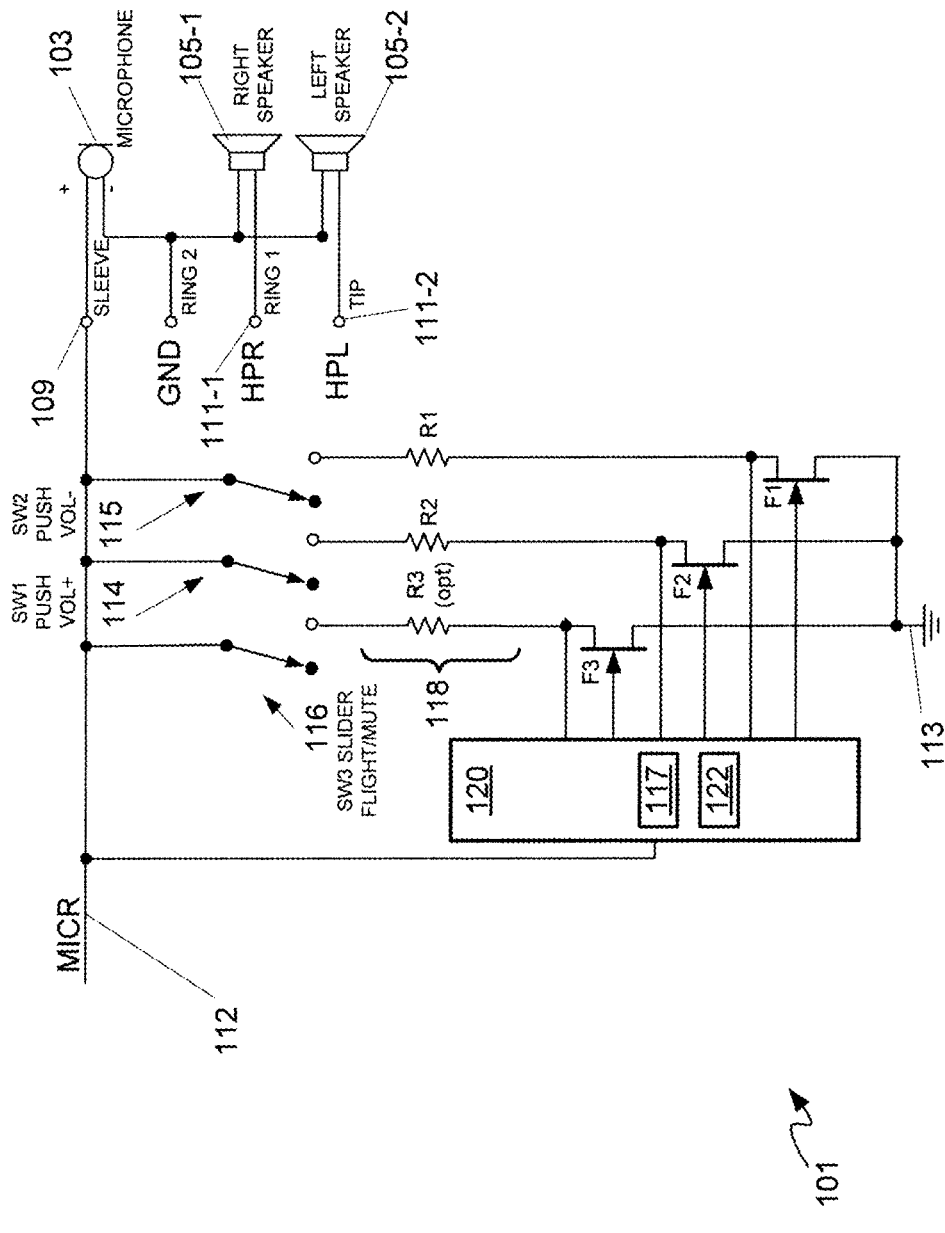
FIG. 2 depicts a schematic block circuit diagram of the headset of FIG. 1, according to non-limiting implementations.

Attention is next directed to FIG. 1 and FIG. 2 which respectively depict a front perspective view and a schematic diagram of a circuit of an audio headset 101, referred to interchangeably hereafter as headset 101, according to non-limiting implementations. Headset 101 comprises: a microphone 103; one or more speakers 105-1, 105-2, each configured for use with a human ear; an audio connector 107 comprising: a microphone output pin 109; and one or more speaker input pins 111-1, 111-2 respectively connected to one or more speakers 105-1, 105-2; a microphone line 112 between microphone output pin 109 and microphone 103; a ground line 113; one or more input devices 114, 115, 116 in communication with microphone line 112; a first circuit 117 configured for active signalling on microphone line 112; a second circuit 118 configured for passive signalling on microphone line 112; and, a processor 120 in communication with one or more input devices 114, 115, 116, processor 120 configured to: determine a present signalling mode; when the present signalling mode comprises an active signalling mode, and when one or more input devices 114, 115, 116 is actuated, generate active signals on microphone line 112 using first circuit 117; and, when the present signalling mode comprises a passive signalling mode, and when one or more input devices 114, 115, 116 is actuated, generate passive signals on the microphone line using second circuit 118. For example, as will be explained in further detail below, generating passive signals can include, but is not limited to, changing a load impedance according to an actuated input device 114, 115, 116.

It is further appreciated that headset 101 comprises audio cables 121-1, 121-2 connecting speakers 105 to other components of headset 101, as well as an audio cables 121-3 connecting audio connector 107 to other components of headset 101. Indeed, audio cables 121-1, 121-2, 121-3 comprise other lines within the schematic circuit shown in FIG. 2; for example audio cable 121-3 can comprise microphone line 112, and audio cables 121-1, 121-2, 121-3 can comprise ground line 113. While not depicted headset 101 can comprise EMI (electromagnetic interference) filtering components, including, but not limited to, capacitors, inductors, ferrite beads, and the like.

In general, headset 101 can be used with an audio device that plays program material, sound data and audio data, and outputs audio signals to an audio port of an external device, which can be mated with audio connector 107, so that the audio signals can be used to drive speakers 105; furthermore, microphone 103 can be used to convey audio signals to the external device for use in telephony and the like. One or more input devices 114, 115, 116 can be used to control volume, mute microphone 103 and/or control playing of audio files and the like at a device with which headset 101 is mated. In some implementations, one of input devices 114, 115, 116 can be used to activate a push-to-talk (PTT) functionality. In other implementations, headset 101 can comprise further input devices, which can be similar or different from input devices 114, 115, 116. In yet further implementations, headset 101 can further comprise one or more indicator output devices including, but not limited to, one or more displays, LEDs (light emitting diodes) and/or other types of indicator output devices.

Hence, headset 101 can be used with external devices that can include one or more of electronic devices, communications devices, computing devices, personal computers, laptop computers, portable electronic devices, mobile computing devices, portable computing devices, tablet computing devices, laptop computing devices, desktop phones, telephones, PDAs (personal digital assistants), cellphones, smartphones, MP3 players, electronic audio players, and the like.

As depicted, headset 101 comprises a 3.5 mm audio headset, and hence audio connector 107 comprises a 3.5 mm audio connector; however, other types of headset and/or audio connectors are within the scope of present implementations. As depicted audio connector 107 comprises four pins however, in other implementations, audio connector 107 comprises five pins, for example a fifth pin containing an extra microphone signal. FIG. 1 further depicts locations of various pins of audio connector 107, presuming audio connector 107 comprises a 3.5 mm audio connector, and further presuming that the 3.5 mm audio connector conforms to a North American Standard. In particular, microphone output pin 109 comprises a "Sleeve" pin of the 3.5 mm audio connector, right input speaker pin 111-1 comprises a "Ring1" pin of the 3.5 mm audio connector, left input speaker pin 111-2 comprises a "Tip" pin of the 3.5 mm audio connector, and the ground pin (labelled "GND" in FIGS. 1 and 2) comprises a "Ring2" pin of the 3.5 mm audio connector. In a European Standard, the location of ground and microphone output pins can be reversed (i.e. a ground pin GND can comprise the "Sleeve" pin, and microphone output pin 109 can comprise the "Ring2" pin).

Microphone 103 can be used to receive sounds from user, for example as the user speaks into microphone 103, and the sound can be converted by microphone 103 to audio signals (e.g. electric audio signals and/or electronic audio signals) which can be conveyed to a device with which headset 101 is mated, for example via microphone output pin 109 and/or microphone line 112.

Speakers 105-1, 105-2 (interchangeably referred to, collectively, as speakers 105, and, generically, as a speaker 105) comprise left and right speakers, each connected to a respective pin of audio connector 107. Each speaker 105 can comprise one or more of an over-ear speaker, an on-ear speaker and in-ear speaker. In addition while two speakers 105 are depicted, in other implementations, headset 101 comprises only one speaker 105, for example for use with a left ear or a right ear of listener.

Input devices 114, 115, 116 each comprise an actuatable switch (indicated as SW1, SW2 and SW3 in FIG. 2), which can be implemented as a button, a push button, a slider switch, and the like, mounted in a chassis 130 (as depicted in FIG. 1) and the like. As depicted, input device 114 comprises a volume increase push button, input device 115 comprises a volume decrease push button, and input device 116 comprises a flight/mute switch. Furthermore, while headset 101 comprises three input devices 114, 115, 116, in other implementations, headset 101 can comprise fewer than three input devices and more than three input devices, with second circuit 118 adapted accordingly. The flight/mute switch can be implemented using a slider switch (as depicted) or a locking switch for in-cabin flight applications; in such implementations, the flight/mute switch can be set in a "flight" position the Sleeve pin (i.e. a Mic Pin) is shorted to the Ring2 pin (i.e. the GND pin) (assuming a 3.5 mm audio connector). This can provide a generally reliable ground connection when using a headset inside an air cabin, where the Ring2/GND pin may be physically located next to the Mic/Sleeve pin. Such implementations can circumvent problems with air cabin connectors manufactured to support a 3-pin headset jack when a 4-pin headset jack is inserted; in such implementations, a reliable ground connection can include shorting the Sleeve pin and the Ring2 pin.

Furthermore processor 120 and/or circuits 117, 118 can be mounted in chassis 130. Such a chassis 130 can be located on any of audio cables 121-1, 121-2, 121-3 though, as depicted chassis 130 is mounted on audio cable 121-3.

Processor 120 is generally in communication with microphone line 112 such that processor 120 is configured to receive signals and/or data on microphone line 112, and alternatively transmit signals and/or data on microphone line 112, for example using first circuit 117. Processor 120 is also generally in communication with input devices 114, 115, 116, which can also be in communication with microphone line 112. Indeed, as depicted, microphone line 112 acts as a bus on which data is communicated between processor 120, input devices 114, 115, 116 and microphone output pin 109 (and hence an external device connected thereto). In some implementation, speaker lines 111-1 and 111-2 can be further configured for signalling; in such implementations, inaudible signaling may be used in order to avoid disturbances to audible audio signals.

In general, input from input devices 114, 115, 116 can be received at processor 120 (which can be implemented as a plurality of processors, including but not limited to one or more central processors (CPUs)). Processor 120 can further comprise one or more hardware processors and/or an ASIC (application-specific integrated circuit) processor. Processor 120 is configured to communicate with a memory 122 which can comprise a non-volatile storage unit (e.g. Erasable Electronic Programmable Read Only Memory ("EE-PROM"), Flash Memory) and/or a volatile storage unit (e.g. random access memory ("RAM")). While, as depicted, memory 122 is depicted as a component and/or a module of processor 120, in other implementations, memory 122 can be external to processor 120, but in communication therewith.

Programming instructions that implement the functional teachings of headset 101 as described herein can be maintained, persistently, in memory 122 and used by processor 120 which makes appropriate utilization of volatile storage during the execution of such programming instructions. Those skilled in the art will now recognize that memory 122 is an example of computer readable media that can store programming instructions executable on processor 120. Furthermore, memory 122 is also an example of a memory unit and/or memory module.

In general, when processor 120 processes such instructions stored at memory 122, processor 120 is configured to: determine a present signalling mode; when the present signalling mode comprises an active signalling mode, and when one or more input devices 114, 115, 116 is actuated, generate active signals on microphone line 112 using first circuit 117; and, when the present signalling mode comprises a passive signalling mode, and when one or more input devices 114, 115, 116 is actuated, generate passive signals on the microphone line using second circuit 118.

Furthermore, memory 122 is an example of a computer-readable medium, and in particular a non-transitory computer-readable medium, storing a computer program, wherein execution of the computer program is for configuring the processor 120 as described herein.

In some implementations, first circuit 117 can comprise a component and/or a module of processor 120, while in other implementations, first circuit 117 can be external to processor 120, but in communication therewith. In particular, in present implementations, first circuit 117 can comprise a tone generator such that the active signals can comprise tones on microphone line 112 as described below. In some implementations, the tone generator is configured to generate tones that are outside of a range of human hearing, but that are detectable at an external device to which headset 101 is mated; in some implementations, such tones can be below about 20 Hz and/or above about 20 kHz.

Second circuit 118 generally comprises one or more devices with a fixed impedance or a variable impedance, which, as implemented in headset 101, comprise resistors R1, R2 and R3, as described in further detail below, however R3 is optional as indicated by the term "opt". However, other second circuit 118 can comprise other types of devices and/or other arrangements of devices with a fixed impedance or variable impedance. In general, however, the fixed impedance or variable impedance (e.g. impedance range and/or impedance settings) is predetermined such that when an impedance change occurs in second circuit 118, as described hereafter, the impedance changes can comprise passive signalling. In other words, when a device in communication with headset 101 determines a given impedance change in second circuit 118, given impedance changes can be recognized as signals to perform related functions.

Furthermore, headset 101 comprises one or more depletion devices, which as depicted comprises FETs (field-effect transistors) F1, F2, F3, configured to be in one or more of a closed state and a conducting state when no input signal is received and/or each of which conducts with no input signal. Each of the depletion devices, for example FETs F1, F2, F3, can comprise a respective JFET (junction gate field-effect transistor and the like.

In general, ground line 113 is shared by each of microphone 103 and one or more speakers 105.

In some implementations, one or more of the depletion mode devices can be replaced with one or more respective enhancement transistors, (for example, one or more respective depletion NMOS (N-type metal-oxide-semiconductor) devices, and the like) as long as processor 120 receives and/or has access to sufficient energy to control the one or more respective enhancement transistors, even when the microphone line 112 is shorted. In some implementations, for example, headset 101 can comprise one or more capacitors configured to store energy from a device to which headset 101 is connected, and processor 120 can be configured to supply energy from the capacitor to the depletion mode device and/or enhancement transistors and/or other components of headset 101s. For example, in some implementations, microphone 103 can receive power temporarily during which the capacitor can be charged for continued operation of processor 120 and/or depletion mode devices and/or enhancement transistors, even when no power is applied or available through audio connector 107.

As depicted in FIG. 2, each of one or more input devices 114, 115, 116 connects microphone line 112 to ground line 113 via a respective resistive device (e.g. a respective device having a predetermined impedance) and a respective FET. For example, input device 114 connects microphone line 112 to ground line 113 via resistor R1 and FET F1, input device 115 connects microphone line 112 to ground line 113 via resistor R2 and FET F2, and input device 116 connects microphone line 112 to ground line 113 via resistor R3 and FET F3. Furthermore, processor 120 can control each of FETs F1, F2, F3 to be in an open state (interchangeably referred to as a non-conducting state) or a close state (interchangeably referred to as a conducting state), so that second circuit 118 can be deactivated (in the open state) or deactivated (in the closed state) accordingly. When second circuit 118 is activated, an impedance on microphone line 112 can be controlled by actuation of one or more of input devices 114, 115, 116: in other words, when one or more switches of input devices 114, 115, 116 is closed, an impedance on microphone line 112 will change as microphone line 112 is shorted to ground line 113 via one or more of resistors R1, R2, R3.

In addition, as depicted processor 120 is configured to measure and/or detect an input to each of FETs F1, F2, F3.

Depletion mode devices and/or JFETs are generally configured to carry current though a source-drain connection, even when zero voltage is applied to a gate terminal. Hence, when there is zero output voltage from processor 120, all of the depletion mode devices and/or JFETs will conduct and thereby provide a path from microphone input pin 109, through the input devices 114, 115, 116 (e.g. switches SW1, SW2,SW3), through the resistive devices R1, R2,R3 (e.g. second circuit 118) and to ground line 113. In other words, the resistive path through the depletion mode devices and/or JFETs is the default path when no power is applied and/or when processor 120 sends out zero voltage and/or when processor 120 does not receive any voltage (e.g. from microphone line 112). The respective gates of the depletion mode devices and/or JFETs can be connected to ground through a high value resistor (e.g. 10 MΩ), but this can be omitted (as depicted), when leakage current from a gate to ground is high enough and/or above a given threshold value.

When disabling the resistive path, processor 120 can generate a negative bias voltage (e.g. using a voltage pump (not depicted) that reverses the supply voltage). This will disable second circuit 118 by disabling FETs F1-F3. In this mode of operation, processor 120 will instead provide an indication of an input device 114, 115,116 position (e.g. switches S1, S2, S3) by applying a signal onto microphone line 112 by modulating the bias voltage with one or more pulses. Processor 120 can detect actuation of input devices 114, 115, 116 using an internal pull-down resistor on each on the lines connected to circuit 118 and to ground line 113 at other end. These pull-down resistors can have a relatively high value (e.g. about 100 kΩ and the like, though other values of resistance are within the scope of present implementations) in order to limit the current consumption. When one or more input devices 114, 115, 116 are actuated, a corresponding input line will go "high" (i.e. reach the microphone bias voltage) and processor 120 detects the actuation.

Such an arrangement enables an input device and/or switch, such as input device 116 and/or switch SW3, to either short the microphone line 112 to ground or, depending on a state of processor 120, to provide one or more pulses when input device 116 and/or switch SW3 is shorted or provide a given change in the microphone bias voltage, such that any change occurs in a manner that prevents audible noise at a receiving end (e.g. at a receiving device). Hence, when microphone switch SW3 (e.g. input device 116) is used for purposes such as PTT (push-to-talk) signaling, without adding an extra switch, because a position of microphone switch SW3 (e.g. input device 116) can be used to initiate a conversation without shorting the audio signal at the same time by proving out-of-band pulses instead of shorting a microphone signal to ground when pressed.

In some implementations, the functionality of each input device 114, 115, 116 can result in a different action such as volume up/down, mute, PTT, camera enable/picture taking, play/pause, fast forward/fast backward etc. In some of these implementations, such changes in functionality can be initiated from an external device, such as a handheld device. In other implementations, such changes can occur via one or more of input devices 114, 115, 116 on the headset 101 being actuated, in sequence and/or simultaneously. For example, signals that are received at processor 120 from an external device and/or from or more of input devices 114, 115, 116 can cause processor 120 to implement a given functionality.

Hence, it should be understood that in general a wide variety of configurations for headset 101 are contemplated. For example, while a wired connection with an external device is described, in other implementations, headset 101 can be configured for wireless connection with an external device, for example using Bluetooth™, and the like.

Figure 3:
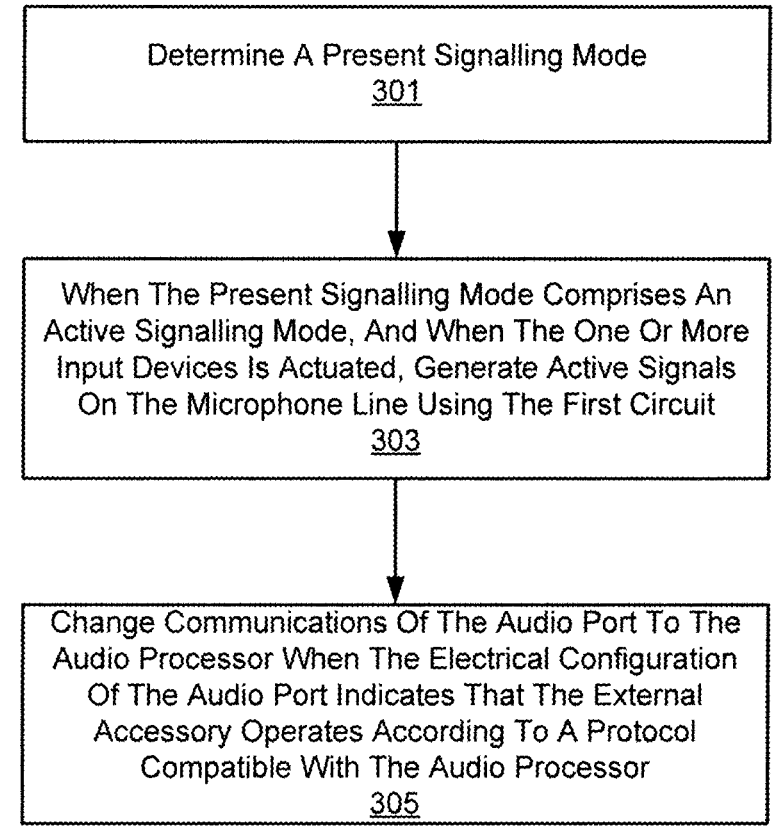
FIG. 3 depicts a block diagram of a flowchart of a method for adapting a headset to a present signalling mode, according to non-limiting implementations.

Attention is now directed to FIG. 3 which depicts a block diagram of a flowchart of a method 300 of adapting a headset to a present signalling mode, according to non-limiting implementations. In order to assist in the explanation of method 300, it will be assumed that method 300 is performed using headset 101, and specifically by processor 120 and when processor 120 processes instructions stored at memory 122. Indeed, method 300 is one way in which headset 101 can be configured. Furthermore, the following discussion of method 300 will lead to a further understanding of headset 101, and its various components. However, it is to be understood that headset 101 and/or method 300 can be varied, and need not work exactly as discussed herein in conjunction with each other, and that such variations are within the scope of present implementations.

Regardless, it is to be emphasized, that method 300 need not be performed in the exact sequence as shown, unless otherwise indicated; and likewise various blocks may be performed in parallel rather than in sequence; hence the elements of method 300 are referred to herein as "blocks" rather than "steps". It is also to be understood, however, that method 300 can be implemented on variations of headset 101 as well.

At block 301, processor 120 determines a present signalling mode.

At block 303, processor 120, when the present signalling mode comprises an active signalling mode, and when one or more input devices 114, 115, 116 is actuated, generates active signals on microphone line 112 using first circuit 117.

At block 305, processor 120 when the present signalling mode comprises a passive signalling mode, and when one or more input devices 114, 115, 116 is actuated, generates passive signals on the microphone line using second circuit 118.

Operation of headset 101 and method 300 will now be discussed with reference to FIGS. 4 to 6, each of which are substantially similar to FIG. 2, with like elements having like numbers.

Figure 4:
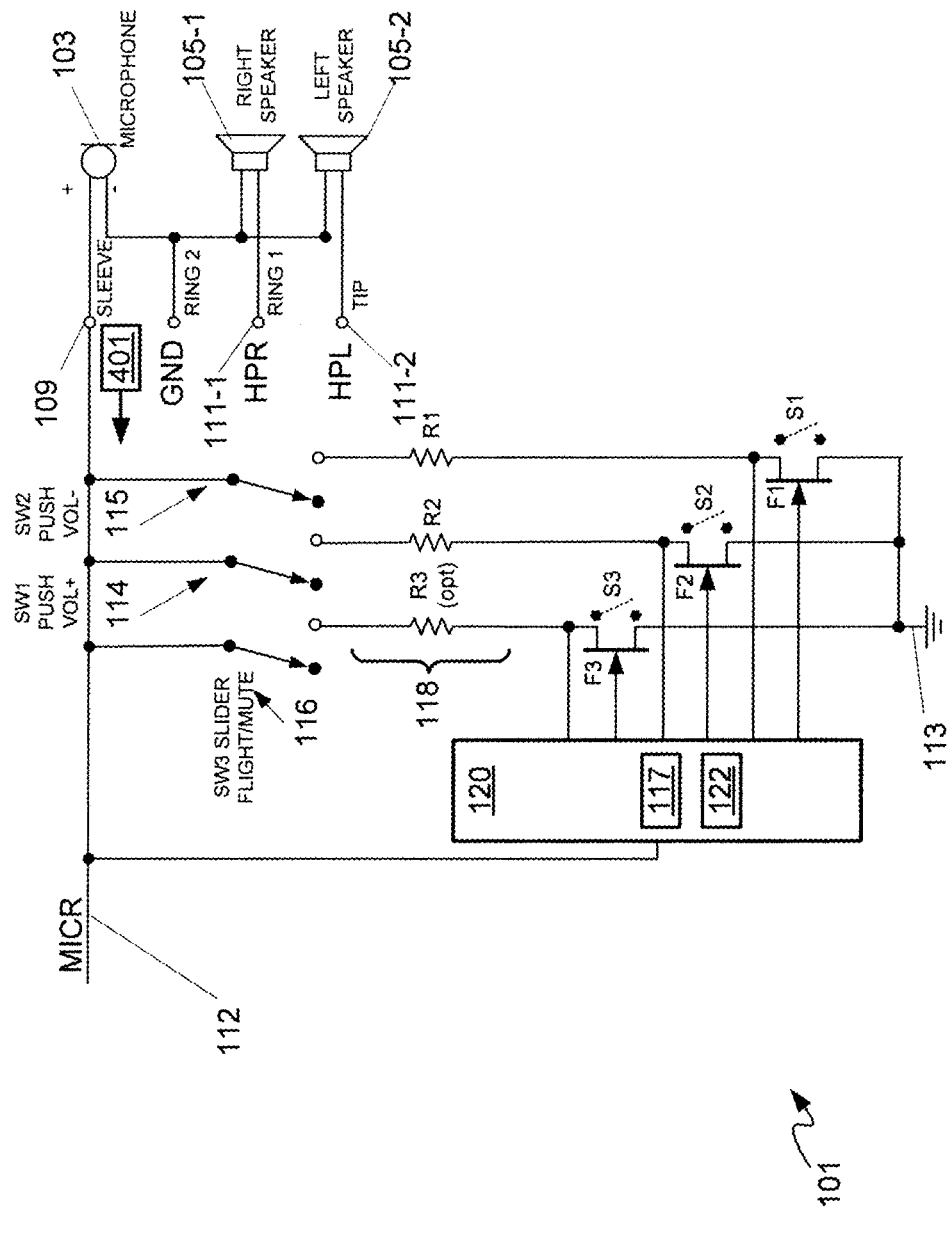
FIG. 4 depicts the device of FIG. 2 detecting a microphone bias voltage, according to non-limiting implementations.

Attention is first directed to FIG. 4, where it assumed that headset 101 is connected to an external device via audio connector 107 (i.e. as shown in FIG. 1). It is further assumed that the external device places a microphone bias voltage 401 on microphone line 112. Indeed, as depicted, processor 120 is in communication with microphone line 112, and hence processor 120 can detect microphone bias voltage 401. In these implementations, microphone bias voltage 401 can also be used to power processor 120 and/or FETs F1, F2, F3 and/or other components of headset 101.

As a level and/or value of microphone bias voltage 401 can depend on the external device to which headset 101 is connected, microphone bias voltage 401 can be used to indicate a signalling mode used by the external device. For example, some external devices which use active signalling can output a microphone bias voltage that is around 2.7V, while other external devices which use passive signalling can output a microphone bias voltage that is around 2V; in some of these implementations, a threshold voltage of about 2.35 V can be used, as described below. Hence, processor 120 can be further configured to determine a present signalling mode based on microphone bias voltage 401 (e.g. block 301 of method 300).

Alternatively, processor 120 can be further configured to determine a present signalling mode by determining whether microphone bias voltage 401 is above or below a threshold microphone bias voltage, which can be stored at memory 122 (e.g. a threshold that is between 2V and 2.7V, and/or about 2.35V) (e.g. block 301 of method 300). While voltages of 2.7V and 2V, and a threshold voltage of 2.35V, are described herein, other voltages and/or thresholds are within the scope of present implementations.

For example, when processor 120 determines that microphone bias voltage is about a first given voltage (e.g. about 2.7V) and/or above a threshold microphone bias voltage, processor 120 can determine a present signalling mode is an active signalling mode; and when processor 120 determines that microphone bias voltage is about a second given voltage (e.g. about 2V) and/or below a threshold microphone bias voltage, processor 120 can determine that a present signalling mode is a passive signalling mode. In some implementations, the microphone 103 can first be connected to microphone line 112 and receive bias current when a certain voltage level has been reached, e.g. above a certain threshold such as about 2.35V.

In yet further alternatives, as processor 120 is in communication with input devices 114, 115, 116, processor 120 can be further configured to determine a present signalling mode by receiving input from one or more input devices 114, 115, 116, the input indicative of a present signalling mode (e.g. block 301 of method 300). In other words, actuation of one or more input devices 114, 115, 116 in one or more given patterns can indicate to processor 120 a given signalling mode. For example, when processor 120 determines that one or more input devices 114, 115, 116 have been actuated in first given pattern, processor 120 can determine that the present signalling mode is an active signalling mode; and when processor 120 determines that one or more input devices 114, 115, 116 have been actuated in second given pattern, processor 120 can determine that a present signalling mode is a passive signalling mode.

In yet further implementations, processor 120 can be configured to determine a present signalling mode by receiving data from an external device on microphone line 112; in other words, an external device can indicate to headset 101 and/or processor 120 on microphone line 112 whether to use an active signalling mode or a passive signalling mode. In some implementations where the external device indicates that an active signalling mode is to be used, headset 101 and/or processor 120 can receive active signalling output states to be used with the external device. For example, an external device can transmit to headset 101 the tones to use to communicate volume increases, volume decreases, muting, track advance, pauses etc. in response to actuation of one or more input devices 114, 115, 116. In some implementations, the tones can be made inaudible by using spectral shaping of the pulses.

In any event, regardless of how processor 120 determines a present signalling mode, processor 120 can control headset 101 to use active signalling or passive signalling depending on the present signalling mode.

For example, in FIG. 4 it is assumed that the present signalling mode is an active signalling mode and hence processor 120 controls each FET F1, F2, F3 to an open state (as indicated by respective switches S1, S2, S3 being in an open state, each of switches S1, S2, S3 being drawn in stippled lines to indicate a state status of respective FETs F1, F2, F3) to deactivate second circuit 118. In general, such control FETs F1, F2, F3 can occur via processor 120 controlling a respective gate voltage. In some implementations the gate voltage can be negative in order to turn off the depletion mode devices and the gate voltage can be derived from a negative voltage charge pump located inside or outside processor 120.

Figure 5:
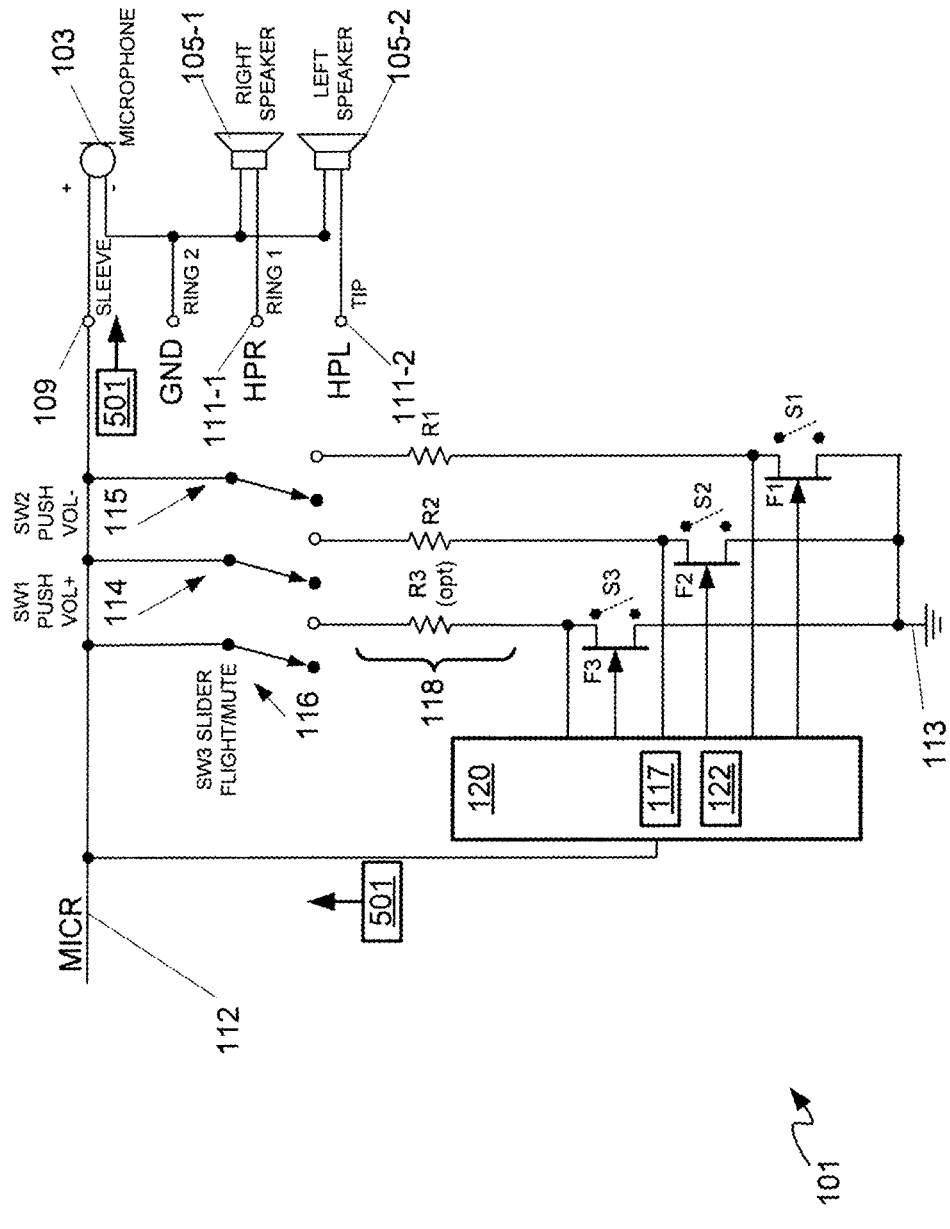
FIG. 5 depicts the device of FIG. 2 operating according to active signalling, according to non-limiting implementations.

Hence, with reference to FIG. 5, when input device 116 is actuated (e.g. switch SW1 is closed), processor 120 can respond by generating a tone 501 using first circuit 117 on microphone line 112 that is detectable by the external device and which acts as a command for the external device to mute microphone line 112 (e.g. block 303 of method 300). In some implementations, processor 120 can implement a soft mute by changing an impedance on microphone line 112 in a controlled manner to eliminate "pops" on microphone line 112; such changes in impedance can occur when controlling the impedance (e.g. using an NMOS transistor, not depicted) between microphone line 112 and ground line 113 whose impedance can be smoothly changed under control of processor 120; alternatively, processor 120 can transmit commands to the external device to implement a soft mute function.

Similar tones of different frequencies can be generated on microphone line 112 when input device 115, 116 are actuated, which act as respective commands for the external device to increase or decrease volume at speakers 105.

Furthermore, such tones can be modulated based on one or more of frequency, amplitude, phase, and/or period. While as described herein, such tones are selected as to be inaudible to human beings (e.g. using spectral shaping where the spectral leakage into an audible band is attenuated by an amount where the tones become inaudible), in other implementations, such tones could be audible to human beings.

In general, memory 122 can storing input states of one or more input devices 114, 115, 116 mapped to given active signal outputs, and processor 120 can be further configured to, when the present signalling mode comprises the active signalling mode, and when the one or more input devices 114, 115, 116 is actuated, generate the active signals on microphone line 112 using first circuit 117 according to the given active signal outputs as based on received input states of the one or more input devices 114, 115, 116. For example, memory 122 can comprise a register where states of one or more input devices 114, 115, 116 are mapped to a respective tone that is to be output on microphone line 112 when one or more input devices 114, 115, 116 are actuated. Furthermore, in some implementations, a combination of active and passive signalling can be used, depending on which of input devices 114, 115, 116 and/or combination of input devices 114, 115, 116 is being actuated.

Figure 6:
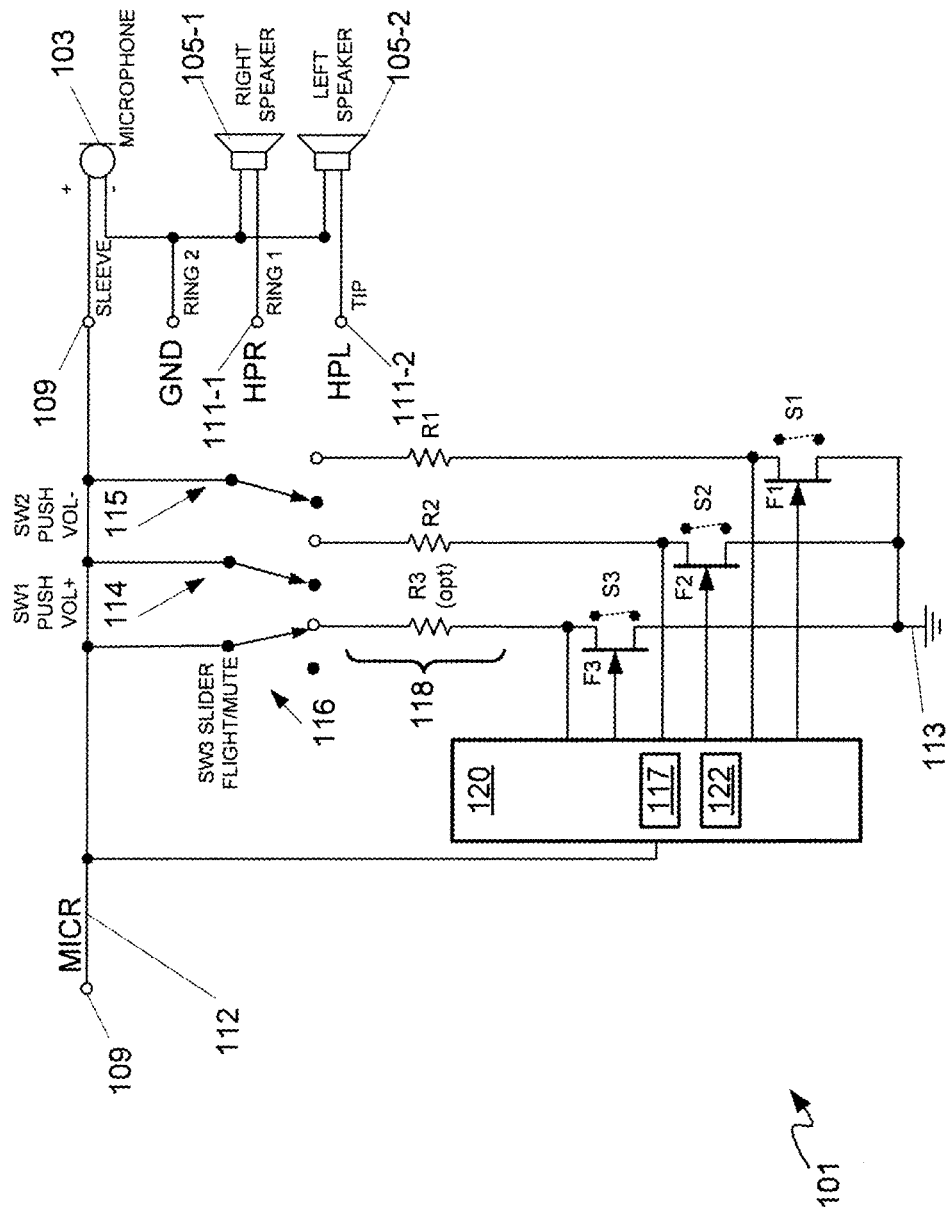
FIG. 6 depicts the device of FIG. 2 operating according to passive signalling, according to non-limiting implementations.

Attention is next directed to FIG. 6 where it is assumed that the present signalling mode is a passive signalling mode and hence processor 120 controls each FET F1, F2, F3 to a closed state to activate second circuit 118. Processor 120 can concurrently deactivate first circuit 117 and/or not use first circuit 117 when one or more of input devices 114, 115, 116 are actuated. In general, such control FETs F1, F2, F3 can occur via processor 120 controlling a respective gate voltage, for example to about 0V in order to enable the depletion mode transistors.

In any event, when second circuit 118 is activated, each of one or more input devices 114, 115, 116 can short microphone line 112 to ground line 113 via a respective device with given impedance when one or more input devices 114, 115, 116 is actuated (i.e. a respective switch is closed), e.g. using resistors R1, R2, R3 in series with respective input devices 114, 115, 116.

As depicted in FIG. 6, input device 114, comprising a mute switch, is actuated and/or closed so that when second circuit 118 is active, microphone line 112 is shorted to ground line 113 via resistor R3, as depicted. The change in impedance on microphone line 112 effectively results in a short of the microphone signal and thereby mutes microphone 103 accordingly. While resistor R3 is optional, using resistor R3 can result in limiting the current when power is supplied through the microphone line 112, i.e. the current to ground line 113 is limited by the finite value of R3. Values of resistance of resistor R3 can be selected to be relatively low, for example in a range of about 20Ω to about 50Ω, however other values of resistor R3 are within the scope of present implementations.

Alternatively, R3 can be optional such that when input device 114, comprising a mute switch, is actuated and/or closed microphone line 112 is directly shorted to ground line 113 with no resistance and/or impedance, which inherently causes microphone line 112 to mute. In these implementations, one or more input devices 114, 115, 116 comprises a mute switch, and second circuit 118 can include FET F3 that conducts with no input signal, FET F3 connecting the mute switch to ground line 113 when second circuit 118 is active, the mute switch configured to connect microphone line 112 to ground line 113 when the mute switch is closed.

Similarly, when input devices 115, 116 are actuated, the change in impedance on microphone line 112 can be detected by the external device which controls the volume to speakers 105 based on a measured impedance between microphone line 112 and ground line 113. Measured impedance can be based on a parallel actuation of input devices 114, 115, 116 and a load from microphone 103 itself, which is taken into account when detecting the impedance changes at an attached external device.

In other words, as depicted, second circuit 118 comprises one or more devices having predetermined impedance, and hence providing a controlled and/or given impedance between microphone line 112 and ground line 113. The passive signals hence comprise impedance changes on microphone line 112 that occur on microphone line 112 using one or more devices having a predetermined respective impedance, the one or more input devices 114, 115, 116 configured to, when actuated, change the connections to change impedance between microphone line 112 and ground line 113. Such changes can be detected by the external device via microphone output pin 109, which in turn can controls signals to the speakers and/or other components of headset 101 based on the impedance changes. The impedance measurement at the external device can be based on measuring the voltage on microphone line 112 and the external device "knowing" (e.g. having such values be predetermined and/or preconfigured) output impedance and output voltage of a microphone bias generator located at the external device; when such values are known, impedance between microphone line 112 and ground line 113 can be determined.

Hence, FIGS. 4 to 6 illustrate that audio headset 101 further comprises respective FETs (field effect transistors), between one or more input devices 114, 115, 116 and ground line 113, processor 120 further configured to: deactivate second circuit 118 by controlling respective FETs F1, F2, F3 to one or more of an open state and a non-conducting state; and activate second circuit 118 by controlling the respective FETs F1, F2, F3 to one or more of a closed state and a conducting state.

Persons skilled in the art will appreciate that there are yet more alternative implementations and modifications possible. For example, other implementations of adaptable headsets can include other types of circuits. For example second circuit 118 in FIGS. 2, 4, 5, and 6 comprises impedance devices in parallel with each other; however in other implementations a second circuit configured for passive signalling can comprise serially connected impedance devices which can be controlled using one or more input devices.

Figure 7:
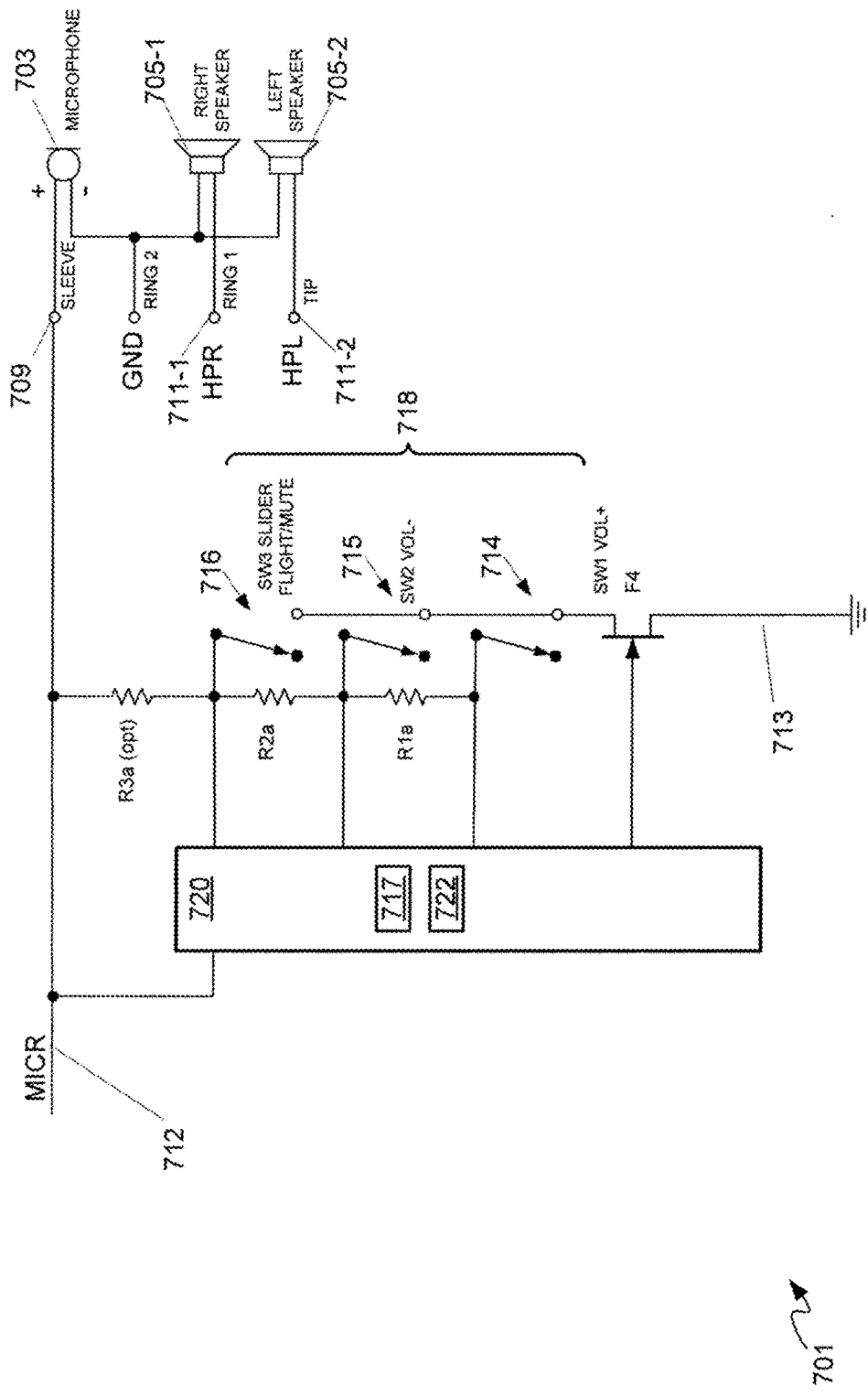
FIG. 7 depicts a schematic block circuit diagram of an alternative headset, according to non-limiting implementations.

Hence, attention is next directed to FIG. 7, which is substantially similar to FIG. 2, with like elements having like numbers, however in a "700" series rather than a "100" series. Hence, FIG. 7 depicts a schematic circuit diagram of a headset 701 which externally can appear similar to headset 101 as depicted in FIG. 1, but includes priority encoding of the switch presses, described in further detail below. Headset 701 comprises: a microphone 703; one or more speakers 705-1, 705-2, each configured for use with a human ear; an audio connector (not depicted) comprising: a microphone output pin 709; and one or more speaker input pins 711-1, 711-2 respectively connected to one or more speakers 705-1, 705-2; a microphone line 712 between microphone output pin 709 and microphone 703; a ground line 713; one or more input devices 714, 715, 716 in communication with microphone line 712; a first circuit 717 configured for active signalling on microphone line 712; a second circuit 718 configured for passive signalling on microphone line 712; and, a processor 720 in communication with one or more input devices 714, 715, 716, processor 720 configured to: determine a present signalling mode; when the present signalling mode comprises an active signalling mode, and when one or more input devices 714, 715, 716 is actuated, generate active signals on microphone line 712 using first circuit 717; and, when the present signalling mode comprises a passive signalling mode, and when one or more input devices 714, 715, 716 is actuated, generate passive signals on the microphone line using second circuit 718. As depicted, processor 720 further comprises a memory 722 similar to memory 122.

However, in contrast to headset 101, in headset 701, impedance devices of second circuit 118 (i.e. resistors R1*a*, R2*a*, and optional R3*a*, each of which are substantially similar to resistors R1, R2, R3), are connected in series, with input devices 714, 715, 716 respectively configured to short a respective impedance device: e.g. input device 716, when actuated connects resistor R3*a* to ground line 113*a*, input device 715, when actuated and/or closed connects resistors R2*a*+R3*a* in series to ground line 113*a*, and input device 714, when actuated and/or closed connects the combination of resistors R1*a*+R2*a*+R3*a* in series to ground line 113*a*. Hence, an impedance of second circuit 718 can be changed by actuating one or more of input devices 714, 715, 716 and the pressing of any of input devices 714, 715, 716 results in a priority encoding of the values, thereby making input device 716 (e.g. switch SW3) the highest priority and input device 714 (e.g. switch SW1) the lowest priority. Compared to implementations where resistors, and the like, are in parallel (as in headset 101), in headset 701 where resistors are in series, when two or more of input devices 714, 715, 716 are actuated simultaneously, priority encoding will result in one of three unique impedances connected to ground (e.g. R3*a*, R3*a*+R2*a*, R3*a*+R2*a*+R1*a*), regardless of the number of input devices 714, 715, 716 being actuated.

Furthermore, second circuit 718 can be activated or deactivated by processor 720 respectively closing or opening FET F4. In other words, second circuit 718 can connect microphone line 712 to ground line 713 via resistors R1*a*, R2*a*, R3*a* when FET F4 is in closed state (i.e. in a conducting state) under control of processor 720, with input devices 714, 715, 716 configured to change an impedance of second circuit 718 by shorting respective resistors R1*a*, R2*a*, R3*a*. When second circuit 718 is disconnected when processor 720 controls FET F4 to an open state and/or non-conducting state, processor 720 can determine whether input devices 714, 715, 716 are actuated or not, as processor 720 is also in communication with each of input devices 714, 715, 716, and first circuit 717 is operated as described above.

Persons skilled in the art will appreciate that there are yet more alternative implementations and modifications possible. For example, other implementations of adaptable headsets can include other types of circuits. For example, in other implementations a second circuit configured for passive signalling can comprise a processor controlling FETs, and the like, in response to input devices being actuated.

Figure 8:
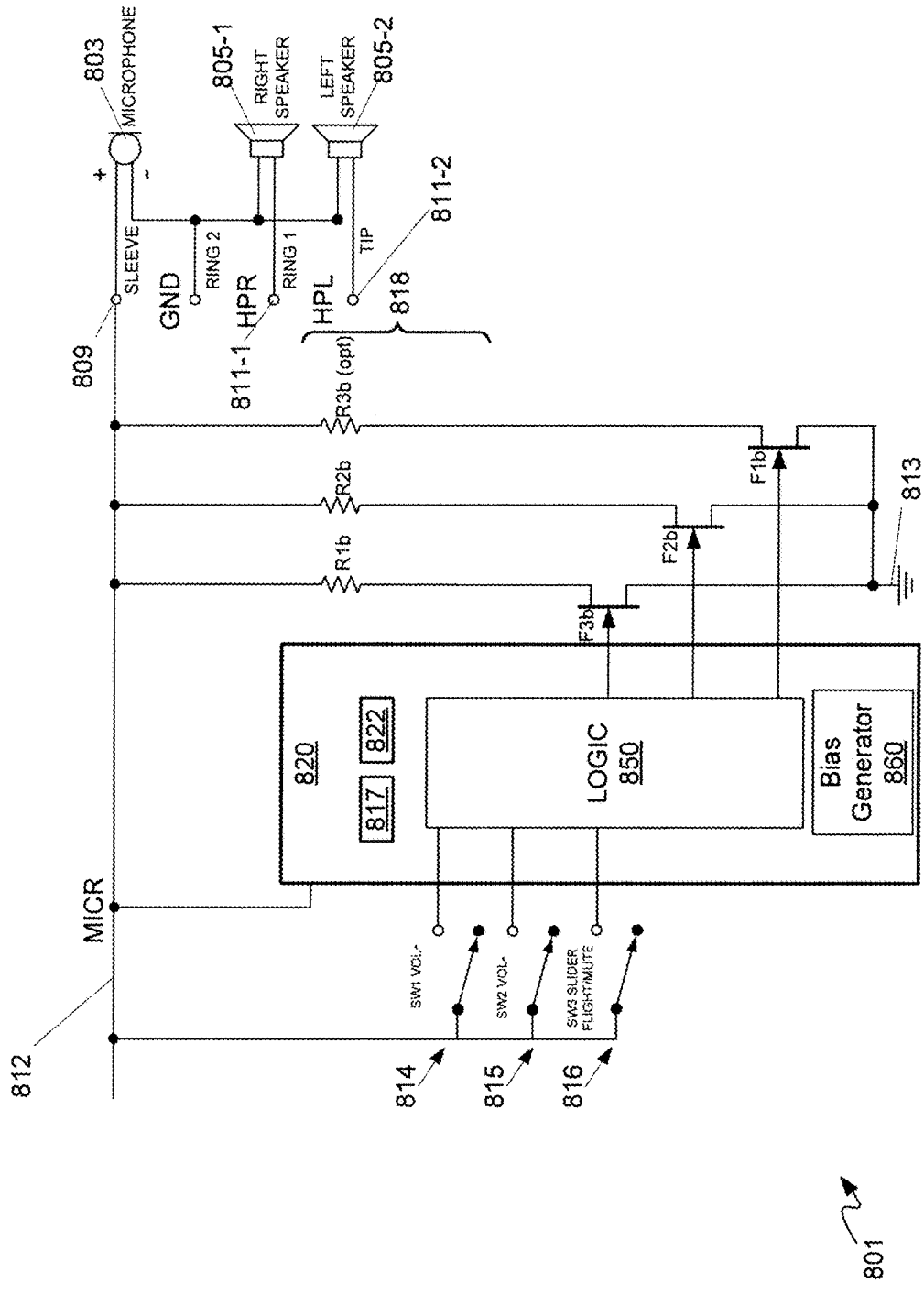
FIG. 8 depicts a schematic block circuit diagram of another alternative headset, according to non-limiting implementations.

Hence, attention is next directed to FIG. 8, which is substantially similar to FIG. 2, with like elements having like numbers, however in an "800" series rather than a "100" series. Hence, FIG. 8 depicts a schematic circuit diagram of a headset 801 which externally can appear similar to headset 101 as depicted in FIG. 1. Headset 801 comprises: a microphone 803; one or more speakers 805-1, 805-2, each configured for use with a human ear; an audio connector (not depicted) comprising: a microphone output pin 809; and one or more speaker input pins 811-1, 811-2 respectively connected to one or more speakers 805-1, 805-2; a microphone line 812 between microphone output pin 809 and microphone 803; a ground line 813; one or more input devices 814, 815, 816 in communication with microphone line 812; a first circuit 818 configured for active signalling on microphone line 812; a second circuit 817 configured for passive signalling on microphone line 812; and, a processor 820 in communication with one or more input devices 814, 815, 816, processor 820 configured to: determine a present signalling mode; when the present signalling mode comprises an active signalling mode, and when one or more input devices 814, 815, 816 is actuated, generate active signals on microphone line 812 using first circuit 818; and, when the present signalling mode comprises a passive signalling mode, and when one or more input devices 814, 815, 816 is actuated, generate passive signals on the microphone line using second circuit 818. As depicted, processor 820 further comprises a memory 822 similar to memory 122. Furthermore, processor 820 comprises logic 850 which is configured to control FETs F1*b*, F2*b*, F3*b*.

Like headset 101, in headset 801, impedance devices of second circuit 118 (e.g. resistors R1*b*, R2*b*, and optional R3*b*, each of which are substantially similar to resistors R1, R2, R3), are connected in parallel. However, in contrast to headset 101, input devices 814, 815, 816 are configured to communicate with processor 820 without directly controlling impedance between microphone line 812 and ground line 813.

In other words, in FIG. 8, second circuit 818 comprises one or more impedance devices (e.g. resistors R1*b*, R2*b*, and optional R3*b*) connecting microphone line 812 to ground line 813 via one or more FETs F1*b*, F2*b*, F3*b*, and passive signals comprise impedance changes on microphone line 812 that occur on microphone line 812 as processor 820 activates and deactivates FETs F1*b*, F2*b*, F3*b* in response to actuation of one or more input devices 814, 815, 816.

For example, when processor 820 determines that present signalling mode is a passive signalling mode, processor 820 determines when one or more of input devices 814, 815, 816 are actuated and in turn places a respective FET F1*b*, F2*b*, F3*b* in a closed state and/or conducting state, for example using a bias generator 860 and/or connecting the depletion mode devices (e.g. one or more of FETs F1*b*, F2*b*, F3*b*) to around zero volt gate potential. Additionally, internal encoding logic at processor 820 can include priority encoding of the key presses (e.g. actuation of input devices 814, 815, 816) similar to the functioning of headset 701. Headset 801 otherwise functions similar to headset 101. In other embodiments, processor 820 can be further configured (e.g. by processing logic 850) to first employ active signalling followed by passive signalling, or vice-versa, thereby employing both types of signalling when depressing any key regardless of the type of device being connected and thereby enabling headset 801 to be used with both active and passive signalling external devices without needing to know a type of external device that is attached.

Persons skilled in the art will appreciate that there are yet more alternative implementations and modifications possible. For example, processors as described herein can comprise more than one hardware module and/or software module configured to perform the described functionality as well as other types of functionality.

Figure 9:
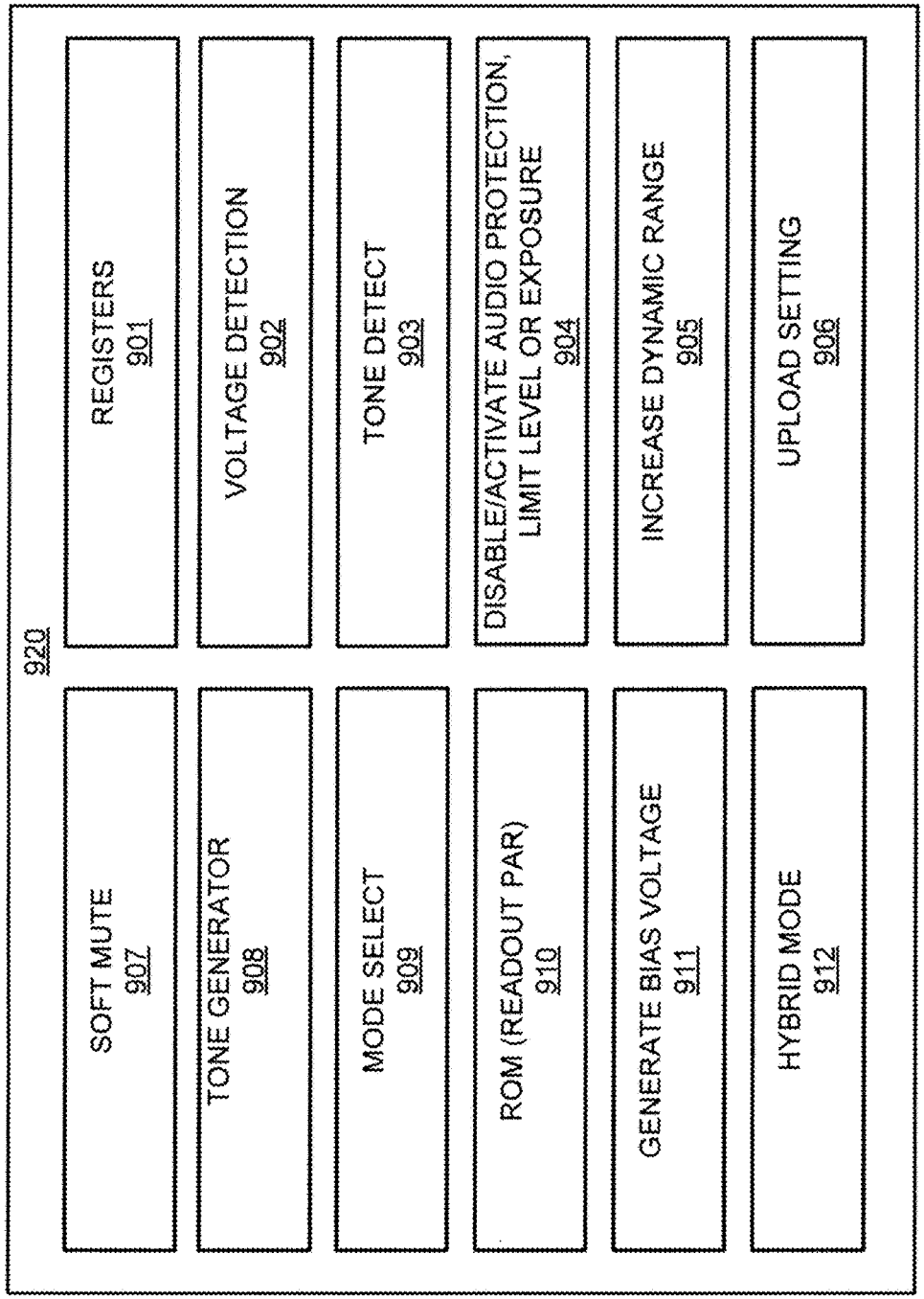
FIG. 9 depicts a processor that can be used in present headsets, according to non-limiting implementations.

Indeed, attention is next directed to FIG. 9 which depicts a non-limiting implementation of a processor 920, and any of processors 120, 720, 820 can comprise processor 920.

In particular, processor 920 comprises a plurality of modules, which can be implemented as a combination of hardware and software modules. Such modules can include, but are not limited to: registers 901, voltage detection module 902, tone detect module 903, audio protection module 904, dynamic range module 905, upload setting module 906, soft mute module 907, tone generator module 908, mode select module 909, ROM (read-only-memory) 910, generate bias voltage module 911, and hybrid mode module 912.

Registers 901 can be stored in any of memories 122, 722, 822, and can store information about a type of a respective headset. In some implementations, registers 901 can include information about acoustic properties of headset 101. In some implementations, registers 901 can be programmed by the external device for optimization of a headset (e.g. the external device can transmit tones to be used with the external device). In other implementations, the register values stored in registers 901 can be non-volatile and provide information about headset type and/or acoustical parameters of a headset.

Voltage detection module 902 can be configured to determine a voltage on a microphone line, as described above. In some implementations, the microphone and associated circuits can be disconnected from the microphone line, until the bias voltage has exceeded a certain threshold, e.g. about 2.35V.

Tone detect module 903 can be configured to detect tones on a microphone line, for example when the external device uses tones to communicate with a headset. Tone detector module 903 can be configured to determine one or more of an amplitude, period, phase and frequency of tones received from an external device. Information encoded in such tones can be used by a headset to control certain settings in the headset, including, but not limited to, selection of a mode (such as a signalling mode), controlling a display, controlling indicators such as LEDs (light emitting diodes) and the like, and/or control functionality of the headset in implementations where the headset contains audio processing functionality and/or used to control a power mode in the headset (e.g. normal/low power/off).

In some implementations, a headset can include a switch and/or functionality to decrease the acoustic output from the headset speakers. The decrease in volume can be programmable or fixed. The decrease in volume can be initiated by the press of a button and/or by signaling from an external device to the headset (e.g. which can be detected by audio protection module 904). In some implementations, a headset can calculate the total acoustic exposure dose output to a user and decrease the volume accordingly by decreasing the sensitivity, when a daily allowed maximum dose is exceeded and/or close to the maximum, as determined using the audio protection module 904. This can allow protection of the user and in some cases increase the usable dynamic range and decrease noise. The decrease in sensitivity can be accomplished by connecting an impedance in series and/or parallel with the speakers thereby reducing the amount of current flowing through these. In other implementations, a change in sensitivity (for example a decrease when the allowed maximum is getting close) can be obtained by signalling back to the device with a message to automatically decrease volume (e.g. similar to the user pressing the volume down button).

Enhanced dynamic range module 905 can include circuits configured to change a sensitivity of a microphone, thereby optimizing an SNR (signal-to-noise ratio) of a microphone for different environments and increasing the usable dynamic range. In some implementations, the change in sensitivity can handled by the headset, while in other implementations the change in sensitivity can be implemented under the control of an external device, either via receipt of input data at an input device and/or by applications controlling a headset. As an example, in a loud environment, the sensitivity can be decreased and for recoding faint acoustic sources e.g. video recording a more sensitive setting can be used. The change in sensitivity can occur by loading a microphone with predetermined impedance connected in parallel with the microphone or by changing the output impedance of the microphone generator located inside an external device. For microphones that work like a current source, this can include decreasing the output impedance of the microphone bias generator which can result in a lower sensitivity. Therefore, for high sensitivity applications like video recording, the output impedance can be high (e.g. about 5 kΩ though other values are within the scope of present implementations), while for low sensitivity applications like rock concert recording, the output impedance of the bias generator can be low (e.g. about 1 kΩ though other values are within the scope of present implementations).

Upload setting module 906 can be configured to receive parameters from the external device to any register located inside the headset. The reception of parameters can be based on pulses, single or multiple, using one of amplitude, frequency, period or phase modulation.

Soft mute module 907 can be configured to mute a microphone signal of headset in a controlled manner, for example by slowly decreasing an impedance of a load in parallel with a microphone line thereby achieving a soft mute function. The soft mute function can be initiated by an external device and/or by actuation of an input device of a headset. In some implementations the external device can invoke a soft mute function by controlling the output impedance of a microphone bias generator. The headset input device can have a fixed functionality (e.g. a mute function is always implemented when the given headset input device is actuated) or be configured for a plurality of functionalities depending on how the headset input device is actuated. In some implementations, the soft mute may be accomplished by the module sending one or more messages to an external connected device.

Tone generator 908 can be a component of first circuits used for active signally as described herein, tone generator 919 configured to generate tones on a microphone line as described above. In some implementations, the tone generator may generate more than one tone in order to signal the depression of a switch.

Mode select module 909 can be configured to determine a present signalling mode as described above.

ROM 910 can comprise read-only-memory storing instructions for operation of a processor of a headset. As an example, the external device can read the acoustic parameters (e.g. "PAR") of the headset from ROM 911 for optimal tuning profile.

Generate bias module 911 can be configured to generate bias voltages for FETs controlled by processor 920, e.g. to generate a negative gate voltage needed to turn off depletion mode transistors.

Hybrid mode module 912 can be configured to initiate the sending of pulses and activation of changes in the impedance on the microphone line 112 (FIG. 1), e.g. to enable compatibility with multiple devices without needing to change the present signalling mode. As an example, the hybrid mode module 912 can be configured to first initiate the sending of one or more inaudible tones, followed by a corresponding change in impedance on the microphone line, for compatibility both with devices compatible with inaudible tone signalling and with device expecting to see impedance changes as a result of switch depressing.

Those skilled in the art will appreciate that in some implementations, the functionality of headsets 101, 701, 801 can be implemented using pre-programmed hardware or firmware elements (e.g., application specific integrated circuits (ASICs), electrically erasable programmable read-only memories (EEPROMs), etc.), or other related components. In other implementations, the functionality of headsets 101, 701, 801 can be achieved using a computing apparatus that has access to a code memory (not depicted) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, the computer-readable program can be stored as a computer program product comprising a computer usable medium. Further, a persistent storage device can comprise the computer readable program code. The computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. An audio headset comprising:
    a microphone;
    one or more speakers, each configured for use with a human ear; an audio connector comprising: a microphone output pin; and one or more speaker input pins respectively connected to the one or more speakers;
    a microphone line between the microphone output pin and the microphone;
    a ground line;
    one or more input devices in communication with the microphone line;
    respective depletion mode devices, between the one or more input devices and the ground line;
    a first circuit configured for active signalling on the microphone line;
    a second circuit configured for passive signalling on the microphone line; and,
    a processor in communication with the one or more input devices and the respective depletion mode devices, the processor configured to:
        determine a present signalling mode by receiving input from the one or more input devices; when the input comprises a first given pattern: determine that the present signalling mode comprises an active signalling mode; activate the first circuit; and deactivate the second circuit; and when the input comprises a second given pattern: determine that the present signalling mode comprises a passive signalling mode; deactivate the first circuit; and activate the second circuit;
        when the present signalling mode comprises the active signalling mode, and when the one or more input devices is actuated, generate active signals on the microphone line using the first circuit, the first circuit comprising a tone generator, and the active signals comprise tones on the microphone line, wherein all of the respective depletion mode devices are in one or more of an open state and a non-conducting state to deactivate the second circuit in the active signalling mode; and,
        when the present signalling mode comprises the passive signalling mode, and when the one or more input devices is actuated, generate passive signals on the microphone line using the second circuit, wherein the second circuit comprises one or more devices having a predetermined respective impedance connecting the microphone line to the ground line via the respective depletion mode devices, and the passive signals comprise impedance changes on the microphone line that occur on the microphone line as the processor activates and deactivates the one or more respective depletion mode devices in response to actuation of the one or more input devices.

2. The audio headset of claim 1, wherein the processor is further configured to determine the present signalling mode by determining whether a microphone bias voltage is above or below a threshold microphone bias voltage.

3. The audio headset of claim 1, wherein the processor is further configured to determine the present signalling mode based on a microphone bias voltage.

4. The audio headset of claim 1, wherein the processor is further configured to determine the present signalling mode based on data received on the microphone line.

5. The audio headset of claim 1, wherein the one or more input devices comprises a mute switch, and the second circuit comprises a depletion mode device that conducts with no input signal, the depletion mode device connecting the mute switch to the ground line when the second circuit is active, the mute switch configured to connect the microphone line to the ground line when the mute switch is closed.

6. The audio headset of claim 1, wherein the ground line is shared by each of the microphone and the one or more speakers.

7. The audio headset of claim 1, wherein the connector comprises a 3.5 mm audio connector.

8. The audio headset of claim 1, further comprising a memory storing input states of the one or more input devices mapped to given active signal outputs, the processor further configured to, when the present signalling mode comprises the active signalling mode, and when the one or more input devices is actuated, generate the active signals on the microphone line using the first circuit according to the given active signal outputs as based on received input states of the one or more input devices.

9. A method comprising:
    at an audio headset comprising: a microphone; one or more speakers, each configured for use with a human ear; an audio connector comprising: a microphone output pin; and one or more speaker input pins respectively connected to the one or more speakers; a microphone line between the microphone output pin and the microphone; a ground line; one or more input devices in communication with the microphone line; respective depletion mode devices, between the one or more input devices and the ground line; a first circuit configured for active signalling on the microphone line; a second circuit configured for passive signalling on the microphone line; and, a processor in communication with the one or more input devices and the respective depletion mode devices:

determining, at the processor, a present signalling mode by receiving input from the one or more input devices: when the input comprises a first given pattern: determining that the present signalling mode comprises an active signalling mode; activating the first circuit; and deactivating the second circuit; and when the input comprises a second given pattern: determining that the present signalling mode comprises a passive signalling mode; deactivating the first circuit; and activating the second circuit;

when the present signalling mode comprises the active signalling mode, and when the one or more input devices is actuated, generating active signals on the microphone line using the first circuit, the first circuit comprising a tone generator, and the active signals comprise tones on the microphone line, wherein all of the respective depletion mode devices are in one or more of an open state and a non-conducting state to deactivate the second circuit in the active signalling mode; and, when the present signalling mode comprises the passive signalling mode, and when the one or more input devices is actuated, generating passive signals on the microphone line using the second circuit, wherein the second circuit comprises one or more devices having a predetermined respective impedance connecting the microphone line to the ground line via the respective depletion mode devices, and the passive signals comprise impedance changes on the microphone line that occur on the microphone line as the processor activates and deactivates the one or more respective depletion mode devices in response to actuation of the one or more input devices.

10. The method of claim 9, further comprising determining the present signalling mode by determining whether a microphone bias voltage is above or below a threshold microphone bias voltage.

11. The method of claim 9, further comprising determining the present signalling mode based on a microphone bias voltage.

12. The method of claim 9, further comprising determining the present signalling mode based on data received on the microphone line.

13. A non-transitory computer-readable medium storing a computer program, wherein execution of the computer program is for:

at an audio headset comprising: a microphone; one or more speakers, each configured for use with a human ear; an audio connector comprising: a microphone output pin; and one or more speaker input pins respectively connected to the one or more speakers; a microphone line between the microphone output pin and the microphone; a ground line; one or more input devices in communication with the microphone line; respective depletion mode devices, between the one or more input devices and the ground line; a first circuit configured for active signalling on the microphone line; a second circuit configured for passive signalling on the microphone line; and, a processor in communication with the one or more input devices and the respective depletion mode devices:

determining, at the processor, a present signalling mode by receiving input from the one or more input devices: when the input comprises a first given pattern: determining that the present signalling mode comprises an active signalling mode; activating the first circuit; and deactivating the second circuit; and when the input comprises a second given pattern: determining that the present signalling mode comprises a passive signalling mode; deactivating the first circuit; and activating the second circuit;

when the present signalling mode comprises the active signalling mode, and when the one or more input devices is actuated, generating active signals on the microphone line using the first circuit, the first circuit comprising a tone generator, and the active signals comprise tones on the microphone line, wherein all of the respective depletion mode devices are in one or more of an open state and a non-conducting state to deactivate the second circuit in the active signalling mode; and, when the present signalling mode comprises the passive signalling mode, and when the one or more input devices is actuated, generating passive signals on the microphone line using the second circuit, wherein the second circuit comprises one or more devices having a predetermined respective impedance connecting the microphone line to the ground line via the respective depletion mode devices, and the passive signals comprise impedance changes on the microphone line that occur on the microphone line as the processor activates and deactivates the one or more respective depletion mode devices in response to actuation of the one or more input devices.

* * * * *